Figure 5:
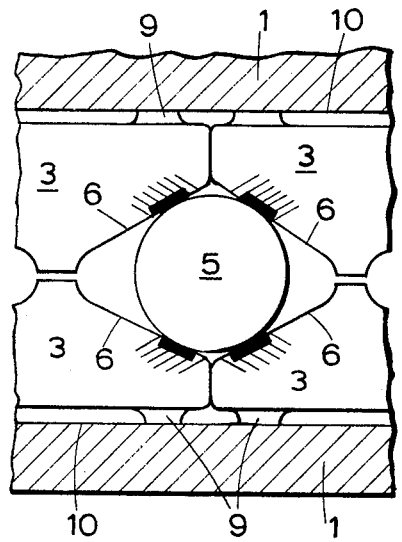

United States Patent [19]

Harrison

[11] 3,964,806
[45] June 22, 1976

[54] THRUST DEVICES

[75] Inventor: Anthony William Harrison, Birmingham, England

[73] Assignee: Girling Limited, Birmingham, England

[22] Filed: Oct. 31, 1974

[21] Appl. No.: 519,774

[30] Foreign Application Priority Data
Nov. 2, 1973  United Kingdom............. 51085/73

[52] U.S. Cl.............................. 308/235; 308/202; 308/219
[51] Int. Cl.²....................................... F16C 33/38
[58] Field of Search........ 308/219, 235, 202, 207 R, 308/215

[56] References Cited
UNITED STATES PATENTS

| | | | |
|---|---|---|---|
| 830,985 | 9/1906 | Fleming | 308/235 |
| 1,122,596 | 12/1914 | Hess | 308/235 |
| 1,913,275 | 6/1933 | Herrmann | 308/235 |
| 2,566,421 | 9/1951 | Lapointe | 308/235 |
| 2,628,137 | 2/1953 | Ashton | 308/235 |

*Primary Examiner*—M. H. Wood, Jr.
*Assistant Examiner*—Richard A. Bertsch
*Attorney, Agent, or Firm*—Scrivener Parker Scrivener and Clarke

[57] ABSTRACT

A thrust device of the kind in which an axial thrust is produced by relative angular movement between two substantially parallel thrust plates between which balls or rollers co-operate with inclined ramp surfaces, for use in a spreading type disc brake for example. Deformable means are provided between a ramp member and a thrust plate carrying it to allow the ramp member to be displaced axially on initial actuation of the device to even out the load between the balls or rollers for subsequent actuations. The deformable means is provided by having a localized area of contact between the wedge member and its thrust plate.

14 Claims, 8 Drawing Figures

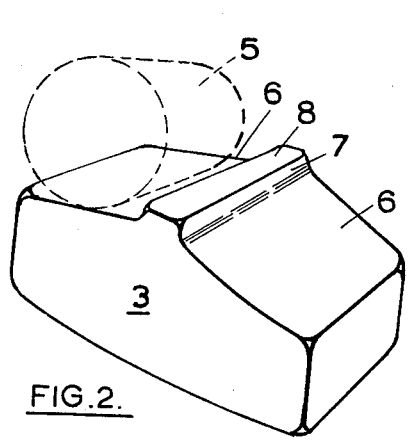
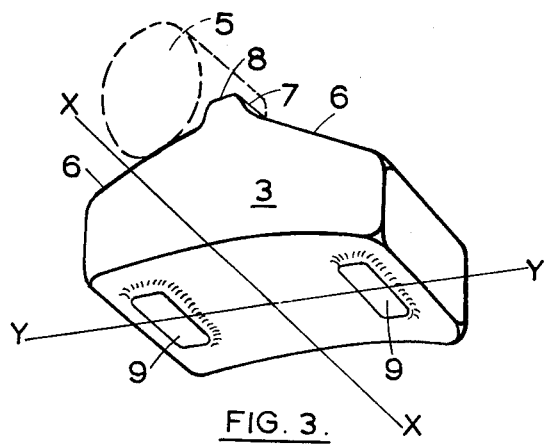
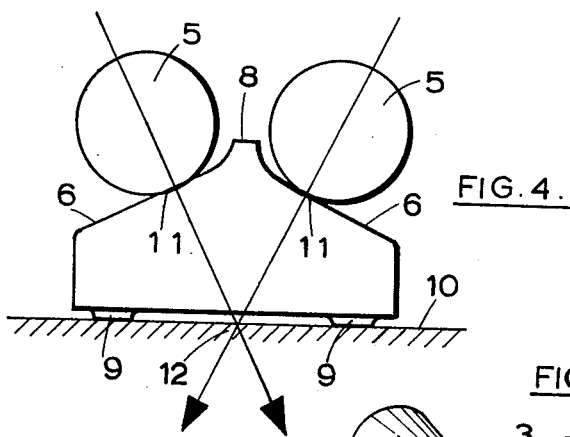
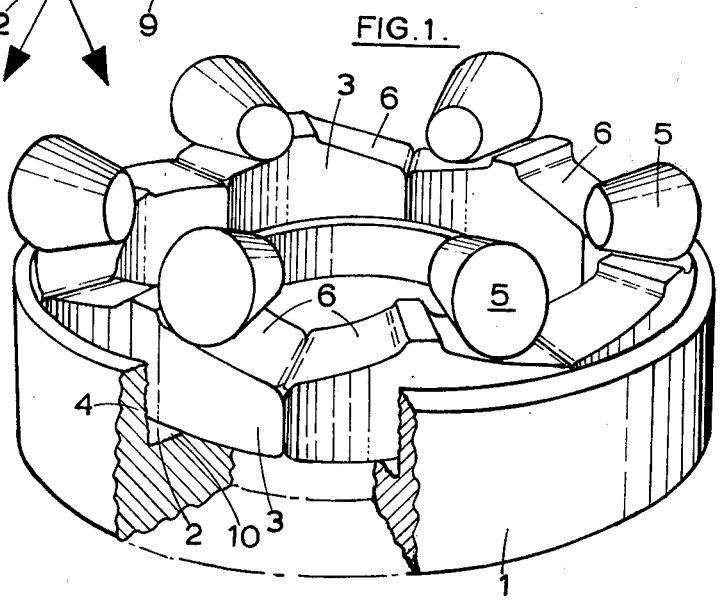

THRUST DEVICES

This invention relates to thrust devices of the kind in which an axial thrust is produced by relative angular movement between two substantially parallel axially aligned thrust plates between which are located balls or rollers co-operating with inclined ramp surfaces on or in the adjacent faces of the plates.

Such thrust devices are commonly used, for example, in brakes of the kind known as spreading disc brakes in which the thrust plates are located between rotatable friction discs which are urged into engagement with stationary surfaces by the axial separation of the plates. An example of such a brake is described in the Complete Specification of our U.K. Pat. No. 1,030,312.

Thrust devices of this kind are relatively simple and inexpensive to manufacture in the smaller sizes, but for devices of large diameter it becomes difficult to machine the individual ramp surfaces such that the axial load is shared equally between the rollers or balls.

If slight misalignment of the thrust plates can be tolerated the problem can be overcome by using only three balls or rollers since the plates can always adjust themselves to seat on these three. However, often more than three balls or rollers are needed to transmit the thrust, or such misalignment cannot always be tolerated.

According to the invention in a thrust device of the kind set forth an inclined ramp surface associated with one thrust plate for co-operation with at least one of the balls or rollers is provided on or in a ramp member carried by that thrust plate and held against circumferential movement relative thereto, and permanently deformable means are provided between the ramp member and the thrust plate so arranged to allow the ramp member under working loads to adjust its position in a substantially axial direction so as to share the axial load more equally between the balls or rollers during subsequent actuations of the device.

The ramp surface may be arranged to co-operate with more than one ball or roller, but usually it will co-operate with only one.

When the device is first used to generate an axial load, and if the ramp member is excessively or unevenly loaded by a ball or roller, the deformable means will yield so as to re-distribute the axial load more equally between the balls or rollers.

One only of the thrust plates may be provided with a ramp member and deformable means, but more often each plate will be provided with at least one ramp member with associated deformable means.

Where a thrust plate is provided with a plurality of ramp members one only or more than one of the members may be provided with associated deformable means.

The deformable means may conveniently comprise at least one load-bearing projection on the ramp member or thrust plate and a surface of the plate or ramp member respectively with which the projection co-operates.

The projection itself could be made deformable but preferably the projection is made of a relatively hard material and said surface of a relatively soft material so that excessive load causes the projection to dig into the surface. This has the advantage that engagement of the projection with the resulting depression helps to key the ramp member against circumferential movement relative to the thrust plate.

The projection is conveniently provided on the ramp member to simplify machining of the thrust plate to receive the ramp member and because the ramp members are normally hardened in any case.

Each ramp member may be formed with a single ramp surface if axial thrust in one direction of rotation only is required, but where axial thrust in both directions of rotation is required each ramp member may be formed with oppositely inclined ramp surfaces of which only one is in operation at any particular time.

The surfaces on the thrust plate itself, or the corresponding surfaces of its forming tool, which locate the ramp members during assembly in radial and axial directions are preferably surfaces of revolution about the axis of the assembly, but these surfaces may be interrupted by local depressions or projections.

When rollers are used the ramp members are preferably supported so that they have some freedom to articulate about a line which is locally circumferential to the axis of the device so as to equalise the load along the length of the roller.

Figure 6:
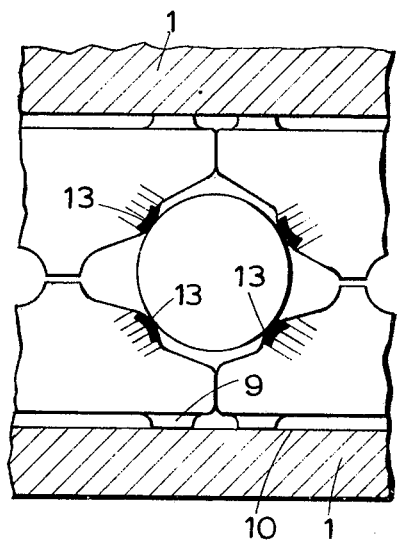
Figure 8:
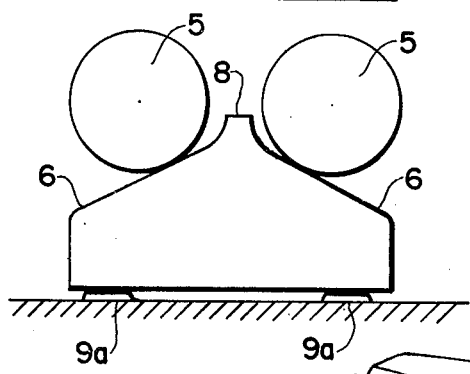
Figure 7:
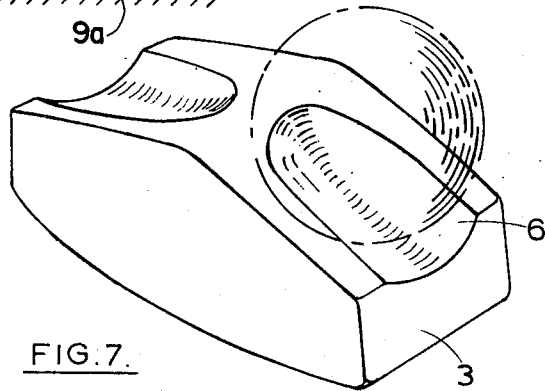

The invention will now be further described, by way of example only, with reference to the accompanying drawings in which:

FIG. 1 is a perspective view, partially broken away, of a thrust device with the rollers in a loaded position, but with the upper thrust plate and the ramp members carried thereby removed, FIG. 2 is a perspective view of one of the ramp members of the device of FIG. 1 showing in chain dotted outline a frusto-conical roller co-operating with one of the ramp surfaces of the member, FIG. 3 is a perspective view of the underside of the ramp member of FIG. 2 showing its two load-bearing projections, FIG. 4 is a diagram showing that the normal force between a roller and a wedge member is arranged to pass through the centroid of the areas of contact with the thrust plate, FIG. 5 is a partial radial view of the device of FIG. 1 showing the co-operation between four ramp members and a roller in the inactive position of the device, FIG. 6 is a similar view to that of FIG. 5 but of a modification, FIG. 7 is a perspective view of a wedge member suitable for use with balls and FIG. 8 is a view similar to FIG. 4 but of a modification in which projections are provided on the thrust plate.

Referring firstly to FIG. 1, a pair of identical opposed thrust plates 1, only one being shown, are each provided with an annular recess 2 in which is retained six wedge members 3 in end to end abutment by the resilience of a flange 4 bounding the recess 2. Six frusto-conical rollers 5 are arranged to co-operate with ramp surfaces 6 of opposed ramp elements, of which only one set are shown.

Referring to FIGS. 2 and 3, each ramp member is provided on its upper side with two oppositely inclined ramp surfaces 6 of substantially constant slope for most of their length but with increasing slope at their inner ends at 7 terminating in a ridge 8 causing a large reduction of mechanical advantage to occur at the end of the roller travel. This tends to prevent over-travel when the device is building up axial load against an elastic constraint such as a brake assembly.

The underside of each wedge member is formed with two projections 9 spaced apart from each other in the circumferential direction of the device to provide a relatively large second moment of area of contact with the plate 1 about the locally radial axis X—X as compared with a relatively small second moment of area about the locally circumferential axis Y—Y. This gives stability against tilting about the axis X—X in spite of the rolling load but allows the wedge member to rock about the axis Y—Y so as to distribute the load more evenly throughout the length of the roller.

The ramp members are of hardened or case hardened steel whereas the surface 10 of the thrust plate 1 with which the projections engage is of a softer material. After initial assembly of the device and during the initial actuations thereof, the axial loads exerted by the individual rollers will differ owing to manufacturing tolerances in the wedge members and thrust plates. Since the axial load is transmitted through the localised areas of contact of the projections 9 with the surface 10 the excess load exerted on some of the wedge members will cause their projections 9 to dig into the surface 10 to deform the surface permanently. This results in a more even distribution of the axial load between the rollers during subsequent actuations of the device.

The firm grip exerted on the wedge members by the flange 4 ensures that once load equalisation has been achieved by deformation of the contact areas the accuracy is not subsequently destroyed by relative movement of the ramp members and thrust plate.

FIG. 4 shows that the line of action of force at the contact point 11 of roller 5, when the roller is on either ramp surface 6 in its loaded position, passes through the centroid 12 of the areas of contact between the projections 9 and the surface 10. Thus when the load exerted by the roller is at a maximum it is substantially evenly distributed between the two contact areas.

FIG. 5 shows the position of a roller when the thrust plates are in their non-actuated positions. The roller is trapped between ramp surfaces of four adjacent wedge members by spring biasing of the thrust plates. The rollers need not be caged with this arrangement, but caged rollers would be required if the inactive positions of the rollers were elsewhere.

FIG. 6 shows a modification in which there is a wider gap between opposed ramp surfaces and the roller is more positively trapped between corners 13. The initial rotational movement of the roller causes a relatively rapid axial displacement of the thrust plates as the roller rides up onto the shallower cam surface.

A ramp member suitable for use with balls is shown in FIG. 7. With this member the projections are modified so as to give an increased stability about the axis Y—Y of FIG. 4 by arranging for the second moment of area of contact of the projections to be increased about the axis Y—Y.

It will be noted that the localised contact areas of the projections 9 in FIG. 3 are not at the extreme ends of the ramp member. This is so that when the members are in abutment any deformation of the surface 10 by one projection does not affect the seating of the adjacent projection of the next member. FIG. 8 shows a modification in which projections 9a are provided on the thrust plate rather than on the wedge member.

I claim:

1. A thrust device comprising two parallel axially aligned thrust plate members angularly movable relative to each other about their mutual axis, at least one ramp member carried by the adjacent face of each of said plate members and opposite to one another, said ramp members each having a ramp surface of which said surfaces are opposed and oppositely inclined, means preventing circumferential movement of said ramp members relative to their respective plate members, bearing elements co-operating with said ramp surfaces of said opposed ramp members whereby upon relative angular movement of said thrust plate members they are forced apart by said bearing elements, and wherein permanently deformable means are provided between at least one of said ramp members and its thrust plate member for allowing said ramp member under working loads to adjust its position substantially axially so as to share the axial load more equally between said bearing elements during subsequent actuations of the device.

2. A thrust device as in claim 1 wherein each of the thrust plate members carries at least one ramp member with permanently deformable means arranged between the ramp member and the plate member which carries it.

3. A thrust device as in claim 2 wherein each thrust plate member carries a plurality of ramp members circumferentially arranged in the adjacent faces of the plate members, and permanently deformable means are provided between at least one of the ramp members associated with each plate member and that plate member.

4. A thrust device as in claim 3 wherein the ramp members are carried in an annular recess in said adjacent face of each plate member.

5. A thrust device as in claim 4 wherein the ramp members are held against circumferential movement in the recess by the resilience of the material of a wall bounding the recess.

6. A thrust device as in claim 1 wherein the deformable means between each ramp member and the thrust plate member which carries it comprises a substantially axially extending load-bearing projection on one of the members and a surface of the other member with which the projection cooperates.

7. A thrust device as in claim 6 wherein the projection is of a relatively hard material, and the surface with which it co-operates is of a relatively soft material.

8. A thrust device as claimed in claim 6 wherein said bearing elements are rollers, and each projection is so arranged that the second moment of the area of contact between each ramp member and the thrust plate member carrying it about a line which is locally circumferential about the axis of the device is substantially less than the second moment of that area about a line which is locally radial to the device axis so that the ramp member can adjust its position by tilting about said first line to distribute the axial load more evenly throughout the length of a roller.

9. A thrust device as in claim 6 wherein a load-bearing projection is provided on each ramp member.

10. A thrust device as in claim 9 wherein each ramp member has more than one load-bearing projection.

11. A thrust device as in claim 9 wherein each ramp member has a pair of load-bearing projections spaced apart in the circumferential direction about the axis of the device.

12. A thrust device as in claim 9 wherein there are more than three bearing elements.

13. A thrust device as in claim 9 wherein said ramp surface and projection are so arranged that the normal of the point or line of contact between a bearing element, and the ramp surface, when the bearing element is in the position it occupies when the thrust device is applying an axial thrust, passes substantially through the centroid of the areas or contact between the ramp member and the thrust plate.

14. A thrust device as in claim 13 wherein each ramp member is formed with two oppositely inclined ramp surfaces for providing an axial thrust upon relative angular movement of the thrust plate members in opposite directions.

* * * * *